United States Patent [19]

Dunbar

[11] Patent Number: 4,694,877

[45] Date of Patent: Sep. 22, 1987

[54] MANUALLY OPERATED SHADE LOWERING AND RAISING MECHANISM FOR ATRIUM WALLS

[75] Inventor: Donn D. Dunbar, Columbus, Ohio

[73] Assignee: Inside Outfitters, Inc., Columbus, Ohio

[21] Appl. No.: 887,485

[22] Filed: Jul. 21, 1986

Related U.S. Application Data

[63] Continuation-in-part of Ser. No. 752,284, Jul. 5, 1985, abandoned.

[51] Int. Cl.⁴ ..................... E06B 9/204; E06B 9/322
[52] U.S. Cl. ............................. 160/273 R; 160/84 R
[58] Field of Search ............... 160/339 U, 84 R P; 47/17 D, 17 A, 17 T, 17 E

[56] References Cited

U.S. PATENT DOCUMENTS

| 522,383 | 7/1894 | Parker | 160/277 |
|---|---|---|---|
| 2,031,157 | 2/1936 | Gilson | 160/120 |
| 2,229,898 | 1/1941 | Pastva | 160/339 |
| 3,151,666 | 10/1964 | Ford | 160/346 |
| 4,062,146 | 12/1977 | Grossman | 160/331 |
| 4,557,310 | 12/1985 | Castellew | 160/84 R |

FOREIGN PATENT DOCUMENTS

| 533128 | 2/1941 | United Kingdom | 160/84 R |
|---|---|---|---|
| 533718 | 10/1976 | U.S.S.R. | 49/86 |

Primary Examiner—Ramon S. Britts
Assistant Examiner—Cherney S. Lieberman
Attorney, Agent, or Firm—John L. Gray

[57] ABSTRACT

A manually operated device for raising and lowering shades on glass-enclosed atrium or greenhouse walls which includes a self-leveling feature which corrects for uneven shade position and enables one to operate a shade on an atrium or greenhouse wall without the use of a motor-driven system.

Also disclosed is a manually operated device for raising and lowering shades on glass-enclosed atrium or greenhouse walls which may be raised or lowered with one hand grasping a handhold on either side of the shade, making it unnecessary to use both handholds.

6 Claims, 9 Drawing Figures

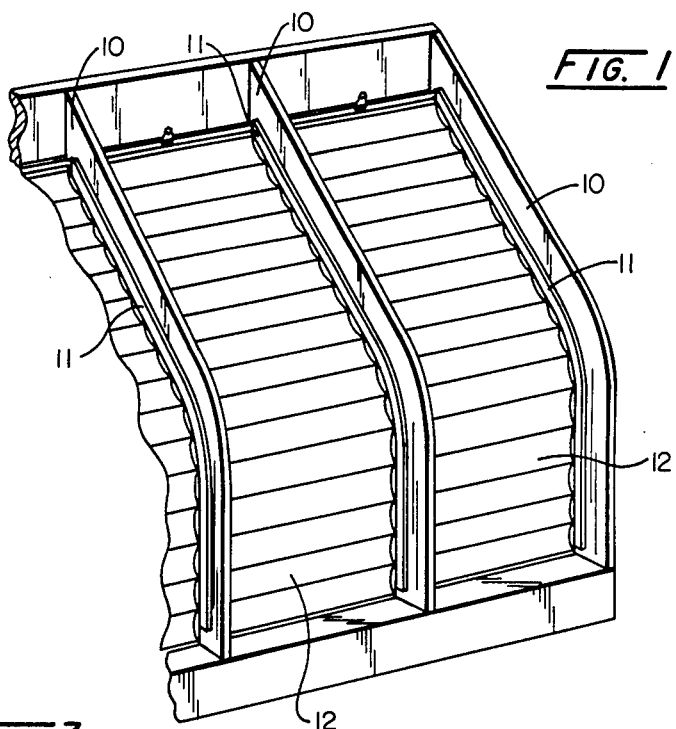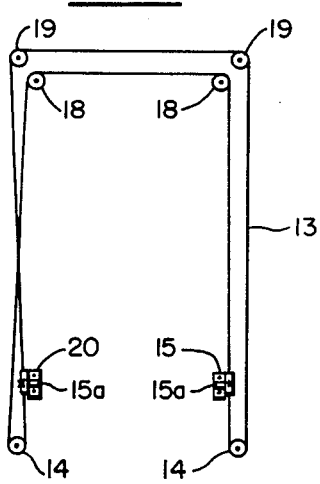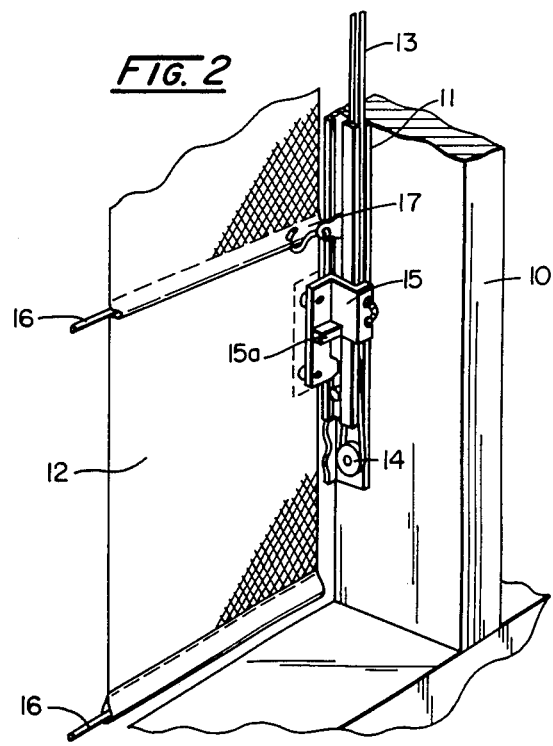

MANUALLY OPERATED SHADE LOWERING AND RAISING MECHANISM FOR ATRIUM WALLS

This is a continuation-in-part application of U.S. patent application Ser. No. 752,284 filed on July 5, 1985, now abandoned.

BACKGROUND OF THE INVENTION

Glass-enclosed atrium or greenhouse structures are being used with greater frequency in restaurants and commercial buildings as well as homes. While these structures have many aesthetic advantages and are pleasing architecturally, in direct sunlight they become practically uninhabitable with severe discomfort on the part of the occupants. Consequently, it is necessary to provide some sort of a shading device which may readily be raised or lowered. Because these structures typically involve a vertical wall of glass which, at its topmost portion is curved to a 45° angle with the upper portion extending at such an angle until it joins the conventional portion of the structure, ordinary shades or blinds will not function because they would hang in an unattractive, ineffective fashion because of the overhanging curved portion of the atrium.

Therefore, it is necessary to provide tracks on which the shades can be supported and, as a consequence, these atriums or greenhouses are usually constructed in sections with tracks spaced two or three feet apart. The shades are thus supported on transversely extending rods that ride in said tracks and the shades are usually permitted to descend by gravity and may be raised by hand or by means of a motorized device. In any case, the shades occasionally will stick in one or the other tracks so that the shades will be askew and cause an unattractive appearance. This can occur either when the shade is raised or when it is lowered.

Power driven devices are available to raise or lower the shades, but these are relatively expensive and in many applications, especially where the atrium or greenhouse is small, it is desirable to have the shades operated manually. The only device of the prior art with which applicant is familiar is U.S. Pat. No. 2,229,898, Pastva, which is an awkward device to use for raising or lowering blinds in these circumstances and involves separate pulls which would not function in the overhanging atrium or greenhouse configuration. Furthermore, this system does not permit self-leveling of the blinds in case they become stuck while being raised or lowered.

SUMMARY OF THE INVENTION

The subject invention is a manually operated device for raising or lowering shades on a glass-enclosed atrium or greenhouse wall which includes a self-leveling feature so that if a shade should get hung up at the bend portion of the atrium or greenhouse wall where the vertical portion joins the sloping portion or elsewhere, the device selfadjusts so that the shades will hang level in the raised or lowered position. The subject invention is susceptible of being operated in a multiple number of glass-enclosed atrium or greenhouse wall sections and is particularly useful in relatively small atrium or greenhouse wall installations.

The subject invention also contemplates a manually operated device for raising and lowering shades in a glass-enclosed atrium or greenhouse wall wherein the shade may be raised or lowered by grasping a single handhold on either side of the shade so the shade may be raised or lowered with one hand.

It is therefore an object of this invention to provide a device to raise and lower shades on an atrium or greenhouse wall.

It is a further object of this invention to provide such a device which will permit the shades to be self-leveling in their open or closed position.

It is a still further object of this invention to provide such a device which may be operated manually.

It is a still further object of this invention to provide such a device which may be operated by one hand.

Additional objects and advantages of the present invention will become more readily apparent to those skilled in the art when the following general statements and descriptions are read in the light of the appended drawings.

BRIEF DESCRIPTION OF THE DRAWINGS

FIG. 1 is a perspective view of a section of typical glass-enclosed atrium or greenhouse showing applicant's invention with the shades on the atrium wall in a closed position.

FIG. 2 is a perspective view of a corner section of the atrium or greenhouse wall showing applicant's invention as applied to a lower portion of the atrium wall showing the attachment to one side of the shade.

FIG. 3 is a schematic view of applicant's invention showing the relationship of the pulley and cords therein.

FIG. 4 is a detailed view of the portion of applicant's invention which is fixedly attached to the lower shade member on the opposite side from that shown in FIG. 2.

DETAILED DESCRIPTION OF THE INVENTION

Figure 5:
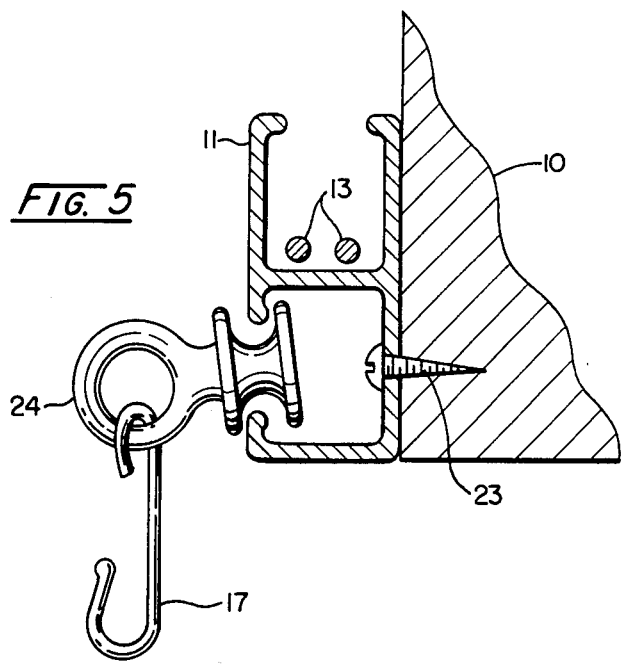
FIG. 5 is a cross-sectional view of the compartmentalized track portion of applicant's invention.

Referring now more particularly to FIG. 1, the atrium or greenhouse wall is shown having mullions 10—10 provided with tracks 11—11 attached thereto. Shades 12—12 are shown in closed position.

Referring now more particularly to FIG. 2, mullion 10 and shade 12 are shown with shade 12 in closed position and with track 11 housing, in one portion, cord 13 which extends around lower pulley 14 and passes through and is slideably positioned in member 15, which is attached to shade 12, and slides in compartmentalized track 11, but may be adjusted upwardly or downwardly by means of handles 15a—15a because cord 13 is slideably positioned in member 15. Shade 12 is supported by rods 16—16 which in turn may be attached to hooks 17—17 which in turn slide in compartmentalized track 11. Rods 16—16 support the shades when the shades are in a semi-horizontal position.

Referring now more particularly to FIG. 3, cord 13 is shown passing over lower pulleys 14—14 on either side of an atrium or greenhouse window segment and around pulleys 18—18 and 19—19. It will be noted that cord 13 is fixedly secured to member 20 which in turn is secured to shade 12. It is important that cord 13 traverse pulley 14 in a different direction on one side of the shade than it does on the other side of the shade. Thus when an individual uses handles 15a—15a to grasp members 15 and 20 to raise or lower the shade 12, upward movement of member 20 will result in corresponding upward movement of member 15 and corresponding upward movement of shade 12, and if the shades become uneven since member 15 slidabely engages cord 13, the horizontal alignment may be readily adjusted.

Referring now more particularly to FIG. 4, member 20 is shown positioned in compartmentalized track 11, and cord 13 may be tied as at 22 to effectively make it an endless cord that also fixedly attaches cord 13 to member 20. Likewise, in operation if it is desired to lower shade 12, it is merely necessary to grasp handholds 15a—15a and pull down on them, remembering that the hand hold on member 15 may be raised or lowered if the device is uneven.

Referring now more particularly to FIG. 5, compartmentalized track 11 is shown in cross section attached to the mullion 10 as by means of screw 23. Cords 13—13 are shown in one section of the compartmentalized track 11 with hook 17 attached to bracket 24 which rides in the other channel of track 11, the two compartments of the tracks being separate by a common wall 26.

Figure 6:
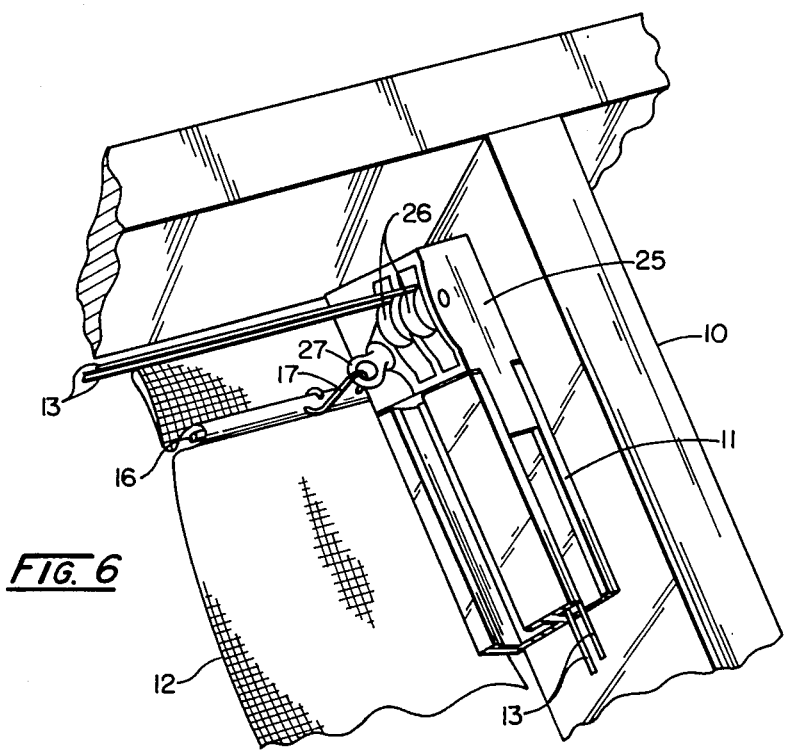
FIG. 6 is a perspective view showing the manner in which applicant's invention is attached to the upper portion of the atrium or greenhouse wall.

Referring now more particularly to FIG. 6, the manner in which applicant's invention is attached to the upper portion of the atrium or greenhouse wall is shown. Mullion 10 has bracket 25 attached thereto which in turn engages compartmentalized track 11, one channel of which houses cord 13—13. Bracket 25 is equipped with pulleys 18 and 19 over which cords 13—13 pass to a comparable fixture on the other side of the window in that portion of the atrium or greenhouse wall. The shade 12 is supported at its upper portion by rod 16 which in turn is connected to hook 17 attached to hook holder 27 which is in turn attached to bracket 25.

Figure 7:
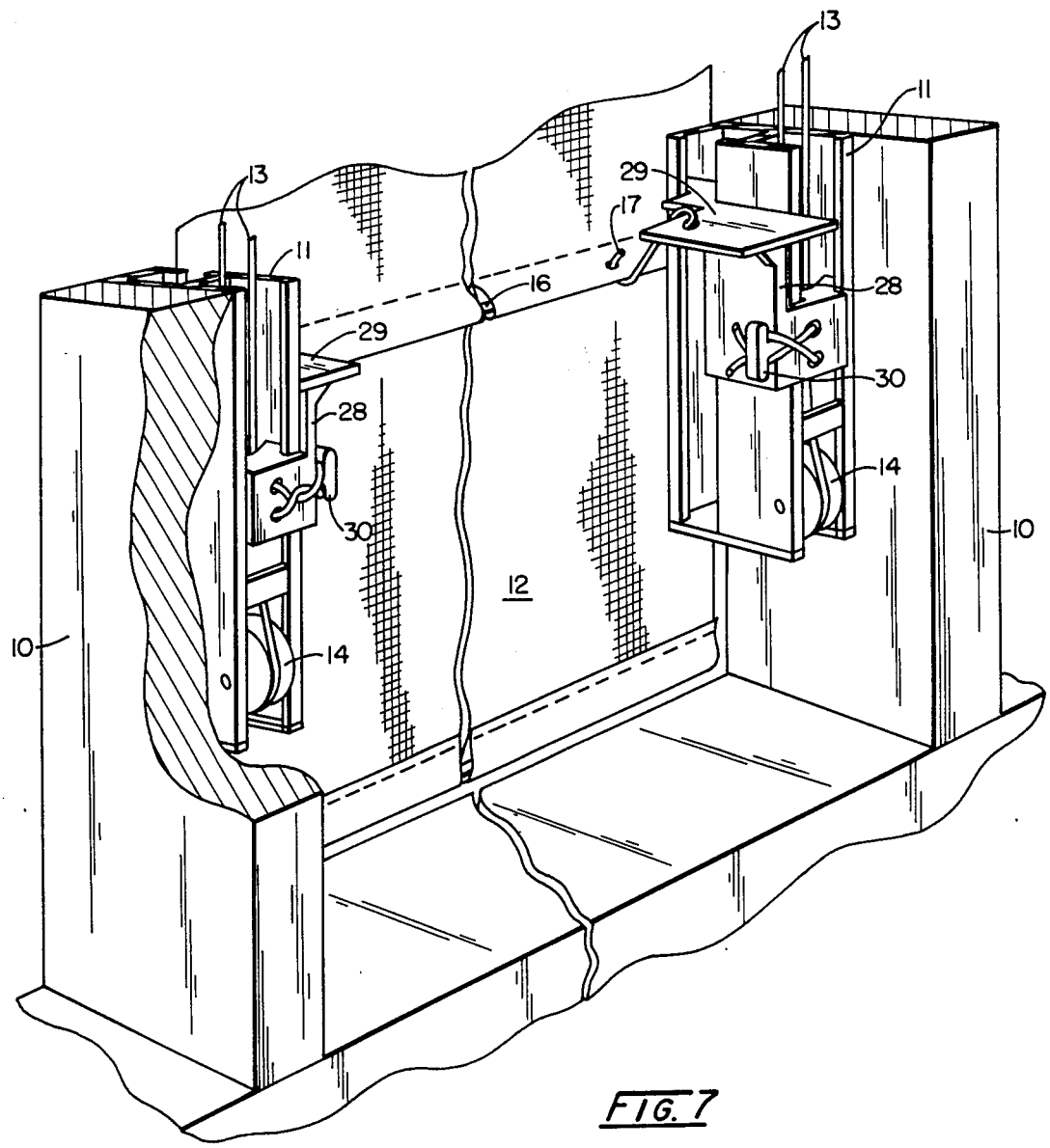
FIG. 7 is a perspective view of a variation of applicant's invention which permits the shade to be raised by one hand showing the lower portion of the shade supporting mechanism.

Referring now more particularly to FIG. 7, mullions 10—10 on either side of the atrium or greenhouse window are provided with compartmentalized tracks 11—11, one channel of which holds cords 13—13, in turn engaging pulleys 14—14 attached to the lower ends of compartmentalized tracks 11—11. Sliding in tracks 11—11 are carriers 28—28 in each track provided with combination handholds 29—29 which also engage hook 17 which in turn engages rod 16 attached to screen 12. Carriers 28—28 are provided with T-shaped fittings 30—30 extending at right angles therefrom to which cords 13—13 may be attached.

Figure 8:
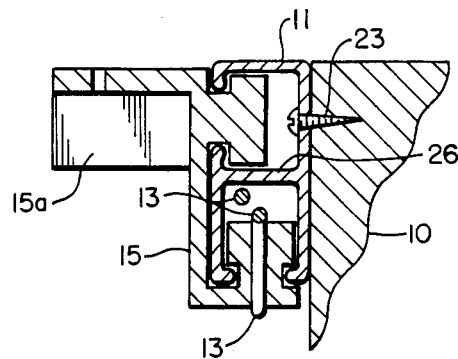
FIG. 8 is a section through member 15 of FIG. 2.
Figure 9:
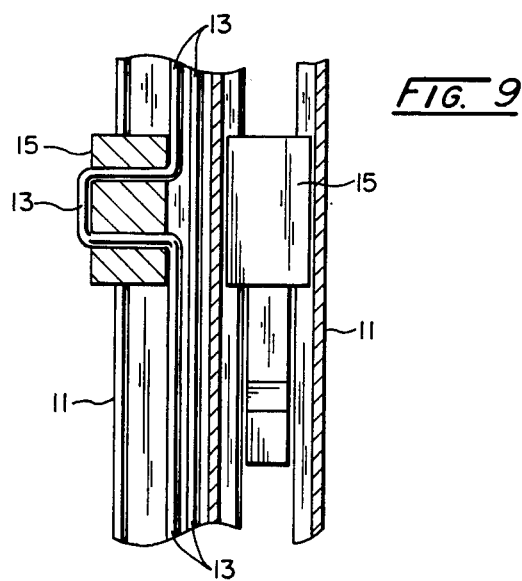
FIG. 9 is a side sectional view of member 15 shown in FIG. 8.

Referring now more particularly to FIGS. 8 and 9, it will be seen that member 15 slides in the two compartments of track 11 with the cords 13—13 passing through one compartment and through member 15 as shown in FIG. 9. In the position shown in FIG. 9, the member 15 may be raised or lowered if the device is uneven. The cord 13 in member 15 may also be tied off similar to the cord 22 in member 20, if desired.

In installing the unit, the unit is leveled and the endless portion of cords 13—13 is twisted and wrapped around the T-shaped fittings 30—30 as shown in the left hand portion of FIG. 7. The two open ends of cords 13—13 in the right hand portion of FIG. 7 are then twisted around the T-shaped fittings 30—30 and tied. In operation either of the handholds 29—29 on the left hand side or the right hand side may be raised or lowered and it will in turn cause the carriers 28—28 to be raised or lowered accordingly thus maintaining the shade in a level position even when going through the curved portion of an atrium or greenhouse wall.

Thus it will be seen that the invention discloses a manually operated device for raising or lowering shades on an atrium or greenhouse wall permitting the shade to be leveled as it is being raised or lowered, and also, in one version of the invention, permitting the shade to be raised or lowered using only one hand.

While this invention has been described in its preferred embodiment, it is to be appreciated that variations therefrom may be made without departing from the scope and spirit of the invention.

What is claimed is:

1. A device for manually raising and lowering a shade on a wall having a vertical portion connected to a concave portion which in turn is connected to a portion approaching the horizontal, said wall being provided with at least one window extending from the vertical portion through the concave portion and into the portions approaching the horizontal, said window being provided with mullions extending throughout the length of said window on either side thereof, at least a portion of said shade being positioned adjacent both said concave portion of said wall and said portion of said wall approaching the horizontal, said device comprising:

at least one oppositely disposed, vertically extending pair of compartmentalized parallel tracks comprising a first and second track attached to said wall, the side of said mullions adjacent said window and of a shape to conform to the contour of said wall, said compartmentalized track having a U-shaped cord guiding portion, the opening of which extends toward said windows and a U-shaped shade supporting portion, the opening of which faces the edge of said shade, and a common wall forming the base of said cord guiding portion and a side of said shade supporting portion, a plurality of shade supports positioned in said shade supporting portion of each of said tracks, a shade positioned between said pair of tracks and connected to said shade supports, said cord guiding portion of each said tracks being provided with means to prevent said cords from touching said shade and from sagging when said cords are in the concave position or in the position approaching the horizontal of said cord guiding portion of each of said tracks, a first pulley and a second pulley positioned at the upper end of each of said tracks, a third pulley positioned at the lower end of each of said tracks, an endless cord positioned in the cord guiding portion of each of said tracks, said cord being positioned on said pulleys so that it engages said third pulley on said first track, then said second pulley on said first track, then said second pulley on said second track, then said third pulley on said second track in a reverse direction, then said first pulley on said second track, then said first pulley on said first track, then returning to said third pulley on said first track, first means for securing one side of the lower portion of said shade to be raised or lowered by said device to said cord between said third pulley and said first pulley on said first track, wherein said means comprises a base portion permanently secured to a lower portion of the shade and an extension to which the cords are secured and which rides in the cord guiding portion of said track wherein said shade may be raised or lowered by manual movement of said first and a second means, said second means for fixedly securing the other side of said lower portion of said shade to be raised or lowered by said device to said cord between said third pulley and said second pulley on said second track, wherein said means comprises a base portion permanently secured to a lower portion of the shade and an extension to which the cords are secured and which rides in the cord guiding portion of said track wherein said shade may be raised or lowered by manual movement of said first and second means.

2. The device of claim 1 wherein said first means for securing one side of the lower portion of said shade includes means for fixedly securing said one side of the lower portion of said shade.

3. The device of claim 1 wherein said wall encloses an atrium or greenhouse and is provided with mullions and said parallel tracks are attached to said mullions.

4. The device of claim 1 wherein said shade is provided with spaced horizontally extending rods and a plurality of sliding members engaging the lower shade supporting portion of said tracks adapted to be attached to said rods.

5. The device of claim 1 wherein said means for fixedly securing said cord to the lower portion of the shade to be raised or lowered by said device is adapted to slide in the upper cord guiding portion of said track.

6. The device of claim 1 wherein said endless cord is formed by securing opposite ends of a cord to said means for fixedly securing the other side of said lower portion of said shade to be raised or lowered by said device to said cord.

* * * * *

UNITED STATES PATENT AND TRADEMARK OFFICE
CERTIFICATE OF CORRECTION

PATENT NO. : 4,694,877
DATED : September 22, 1987
INVENTOR(S) : Donn D. Dunbar

It is certified that error appears in the above-identified patent and that said Letters Patent are hereby corrected as shown below:

On the first page at [54] in the third line of the title insert the words "or greenhouse" after the word "atrium".

In column 1 of the specification in the third line of the title insert the words "or greenhouse" after the word "atrium".

Signed and Sealed this

Nineteenth Day of January, 1988

Attest:

DONALD J. QUIGG

*Attesting Officer*

*Commissioner of Patents and Trademarks*